United States Patent
Merity et al.

(10) Patent No.: US 12,014,257 B2
(45) Date of Patent: Jun. 18, 2024

(54) DOMAIN SPECIFIC LANGUAGE FOR GENERATION OF RECURRENT NEURAL NETWORK ARCHITECTURES

(71) Applicant: Salesforce, Inc., San Francisco, CA (US)

(72) Inventors: Stephen Joseph Merity, San Francisco, CA (US); Richard Socher, Menlo Park, CA (US); James Bradbury, San Francisco, CA (US); Caiming Xiong, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 1030 days.

(21) Appl. No.: 15/953,265

(22) Filed: Apr. 13, 2018

(65) Prior Publication Data
US 2018/0336453 A1 Nov. 22, 2018

Related U.S. Application Data

(60) Provisional application No. 62/578,371, filed on Oct. 27, 2017, provisional application No. 62/508,984, filed on May 19, 2017.

(51) Int. Cl.
*G06N 3/045* (2023.01)
*G06N 3/044* (2023.01)
*G06N 3/048* (2023.01)
*G06N 3/082* (2023.01)
*G06N 5/01* (2023.01)

(52) U.S. Cl.
CPC ............. *G06N 3/045* (2023.01); *G06N 3/044* (2023.01); *G06N 3/082* (2013.01); *G06N 5/01* (2023.01); *G06N 3/048* (2023.01)

(58) Field of Classification Search
CPC ........ G06N 3/045; G06N 3/044; G06N 3/082; G06N 5/01; G06N 3/048
See application file for complete search history.

(56) References Cited

U.S. PATENT DOCUMENTS

2019/0251439 A1* 8/2019 Zoph ...................... G06N 3/044

FOREIGN PATENT DOCUMENTS

JP 2004-192584 A 7/2004

OTHER PUBLICATIONS

Mitra, Neural Models for Information Retrieval, arVix, May 3, 2017 (Year: 2017).*

(Continued)

*Primary Examiner* — Aniss Chad
*Assistant Examiner* — Shien Ming Chou
(74) *Attorney, Agent, or Firm* — Haynes and Boone, LLP (57) ABSTRACT

A system automatically generates recurrent neural network (RNN) architectures for performing specific tasks, for example, machine translation. The system represents RNN architectures using a domain specific language (DSL). The system generates candidate RNN architectures. The system predicts performances of the generated candidate RNN architectures, for example, using a neural network. The system filters the candidate RNN architectures based on their predicted performance. The system generates code for selected a candidate architectures. The generated code represents an RNN that is configured to perform the specific task. The system executes the generated code, for example, to evaluate an RNN or to use the RNN in an application.

26 Claims, 9 Drawing Sheets

(56) References Cited

OTHER PUBLICATIONS

Gygli, Deep Value Networks Learn to Evaluate and Iteratively Refine Structured Outputs, arXiv, Mar. 2017 (Year: 2017).*
Mitra, Neural Models for Information Retrieval, arVix, May 2017 (Year: 2017).*
Stanley, Evolving Neural Networks through Augmenting Topologies, Evolutionary Computation, ECJ vol. Iss. 2, Jun. 2002 (Year: 2002).*
Khan, Evolution of Optimal ANNs for Non-Linear Control Problems using Cartesian Genetic Programming, IEEE Congress on Evolutionary Computation (pp. 1-8), 2010 (Year: 2010).*
U.S. Appl. No. 62/414,300 specification (Year: 2016).*
U.S. Appl. No. 62/414,300 claim (Year: 2016).*
Zoph, Neural Architecture Search with Reinforcement Learning, arXiv, Feb. 2017 (Year: 2017).*
Bradbury, J. et al., "Quasi-Recurrent Neural Networks," ICLR 2017, 12 pages.
CS 224D: Deep Learning for NLP, Lecture Notes Part I, Spring 2015, Course Instructor: R. Socher, Authors: F. Chaubard et al., stanford.edu, 2015, pp. 1-11.
CS 224D: Deep Learning for NLP, Lecture Notes Part II, Spring 2015, Course Instructor: R. Socher, Authors: R. Mundra et al., stanford.edu, 2015, pp. 1-11.
CS 224D: Deep Learning for NLP, Lecture Notes Part III, Spring 2015, Course Instructor: R. Socher, Authors: R. Mundra et al., stanford.edu, 2015, pp. 1-14.
CS 224D: Deep Learning for NLP, Lecture Notes Part IV, Spring 2015, Course Instructor: R. Socher, Authors: M. Mohammadi et al., stanford.edu, 2015, pp. 1-11.
CS 224D: Deep Learning for NLP, Lecture Notes Part V, Spring 2015, Course Instructor: R. Socher, Authors: F. Chaubard et al., stanford.edu, 2015, pp. 1-6.
Schrimpf, M. et al., A Domain Specific Language for Automated RNN Architecture Search, Dec. 14, 2017, five pages. [Online] [Retrieved from the internet] Retrieved on Aug. 23, 2018, URL:<https://einstein.ai/research/domain-specific-language-for-automated-rnn-architecture-search>.
Schrimpf, M. et al., "A Flexible Approach to Automated RNN Architecture Generation," ICLR 2018, 17 pages.
Japan Patent Office, Office Action, JP Patent Application No. 2018-095206, dated May 17, 2022, four pages.

* cited by examiner

DOMAIN SPECIFIC LANGUAGE FOR GENERATION OF RECURRENT NEURAL NETWORK ARCHITECTURES

CROSS-REFERENCE TO RELATED APPLICATIONS

This application claims the benefit of U.S. Provisional Application No. 62/508,984 filed May 19, 2017 and U.S. Provisional Application No. 62/578,371 filed Oct. 27, 2017, each of which is incorporated by reference herein.

BACKGROUND

This disclosure relates generally to recurrent neural network architectures, and more specifically to automatic generation of recurrent neural network architectures expressed using a domain specific language.

A neural network or artificial neural network is composed of a large number of highly interconnected processing elements (neurons) that work together to solve specific problems. Neural networks, can derive information from complicated or imprecise data and can be used to extract patterns or detect trends that are too complex to be noticed by humans or other computer techniques. Neural networks can be represented as weighted directed graphs in which artificial neurons are nodes and directed edges with weights are connections between neuron outputs and neuron inputs. Neural networks are used for performing complex tasks, for example, natural language processing, computer vision, speech recognition, bioinformatics, recognizing patterns in images, and so on. A recurrent neural network (RNN) is a class of artificial neural network where connections between neurons form a directed cycle.

The success of a neural network largely depends on the architecture of the neural network. The architecture of a neural network defines how the neurons of the neural network are arranged in relation to each other. Human experts, guided by intuition, explore an extensive space of potential architectures where even minor modifications can produce unexpected results. As a result, the process of designing neural network architectures is slow, costly, and laborious. Therefore, conventional techniques for designing neural network architectures are time consuming and often produce sub-optimal architectures.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

System Environment

Figure 1:
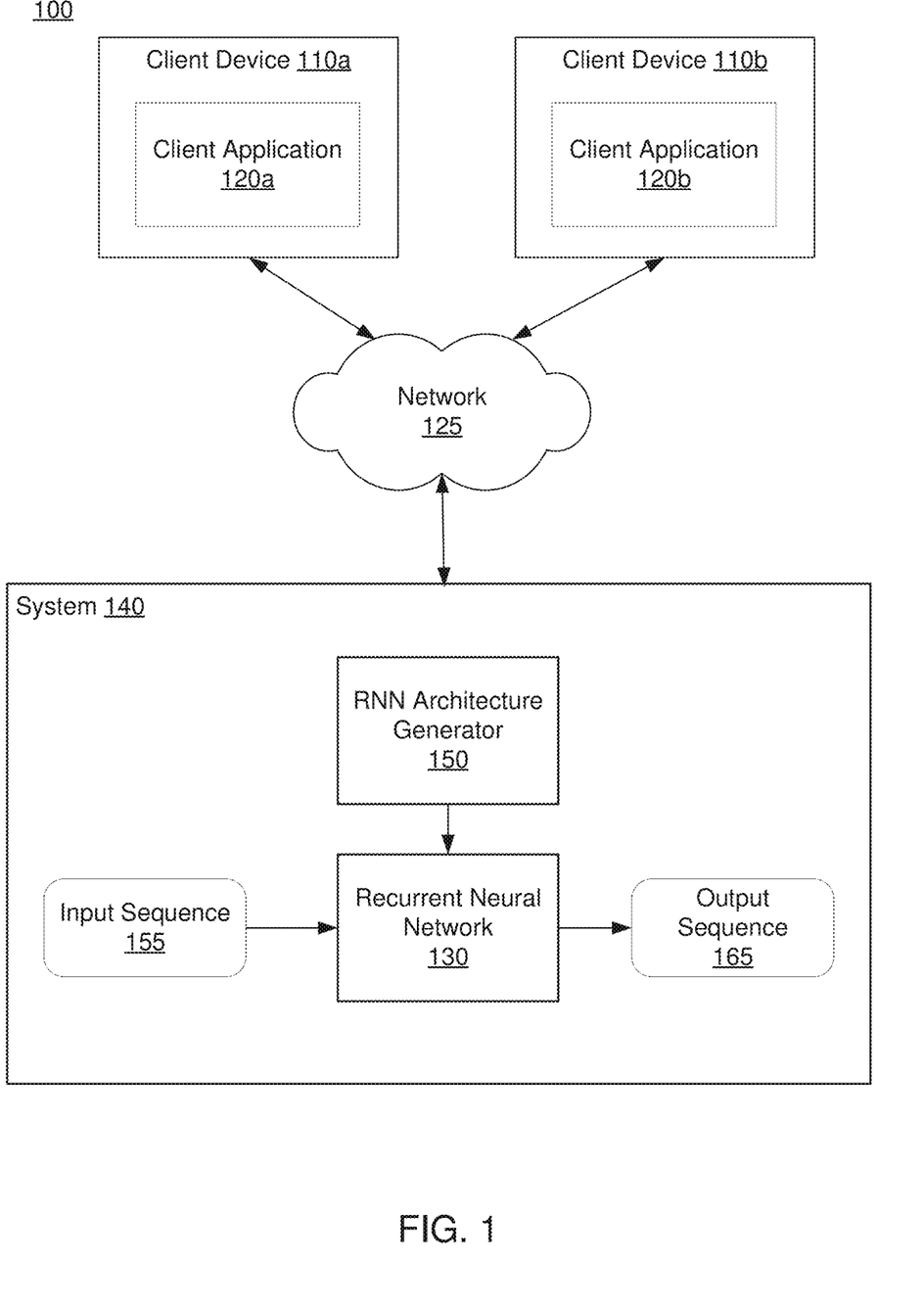
FIG. 1 is a block diagram of a system environment for generating RNN architectures and executing RNNs based on the generated architectures, in accordance with an embodiment.

FIG. 1 is a block diagram of a system environment for generating RNN architectures and executing RNNs based on the generated architectures, in accordance with an embodiment. The system environment 100 shown by FIG. 1 comprises one or more client devices 110, a network 125, and the system 140. In alternative configurations, different and/or additional components may be included in the system environment 100. For example, the system 140 may be an online system or a system that works offline.

The system 140 includes an RNN architecture generator 150. The RNN architecture generator 150 automatically generates RNN architectures configured to perform certain task, for example, machine translation. The RNN architecture generator 150 represents various candidate architectures using a domain specific language (DSL). The RNN architecture generator 150 evaluates the performance of the various candidate RNN architectures and selects an RNN architecture based on the performance. The RNN architecture generator 150 generates an RNN 130 based on an RNN architecture.

As shown in FIG. 1, the RNN 130 is configured to receive an input sequence 155 and generate an output sequence 165. The input sequence 155 can be a sentence in a language and the output sequence 165 can be a sentence in another language. However the input/output sequences are not limited to textual data but may represent other types of data, for example, audio sequences or sequential pixels in an image. The input sequence 155 may be received from a client application 120 executing on a client device 110. The result of executing the RNN 130 may also be provided to the client application 120, for example, for display to a user of the client device 110. In some embodiments, the system 140 is a parallel or distributed system comprising multiple processors. For example, the system 140 may perform the training and/or execution of the RNN 130 in parallel.

The client devices 110 are one or more computing devices capable of receiving user input as well as transmitting and/or receiving data via the network 125. In some embodiments, the client device 110 is used to provide input data to the system 140, for example, to provide input sequence 155 processed by an RNN 130 and to provide the output sequence 165 for display to a user. Accordingly, the client device 110 executes an application providing a user interface for interacting with various components of the system 140. In other embodiments, the client device itself stores an RNN 130 and is able to process an input sequence 155 using an RNN 130 to generate an output sequence 165.

In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 125. In one embodiment, a client device 110 executes an application allowing a user of the client device 110 to interact with the system 140. For example, a client device 110 executes a browser application to enable interaction between the client device 110 and the system 140 via the network 125. In another embodiment, a client device 110 interacts with the system 140 through an application programming interface (API) running on a native operating system of the client device 110, such as IOS® or ANDROID™.

The network 125 may comprise any combination of local area and/or wide area networks, using both wired and/or wireless communication systems. In one embodiment, the network 125 uses standard communications technologies and/or protocols. Data exchanged over the network 125 may be represented using any suitable format, such as hypertext markup language (HTML) or extensible markup language (XML). In some embodiments, all or some of the communication links of the network 125 may be encrypted using any suitable technique or techniques.

Figure 2:
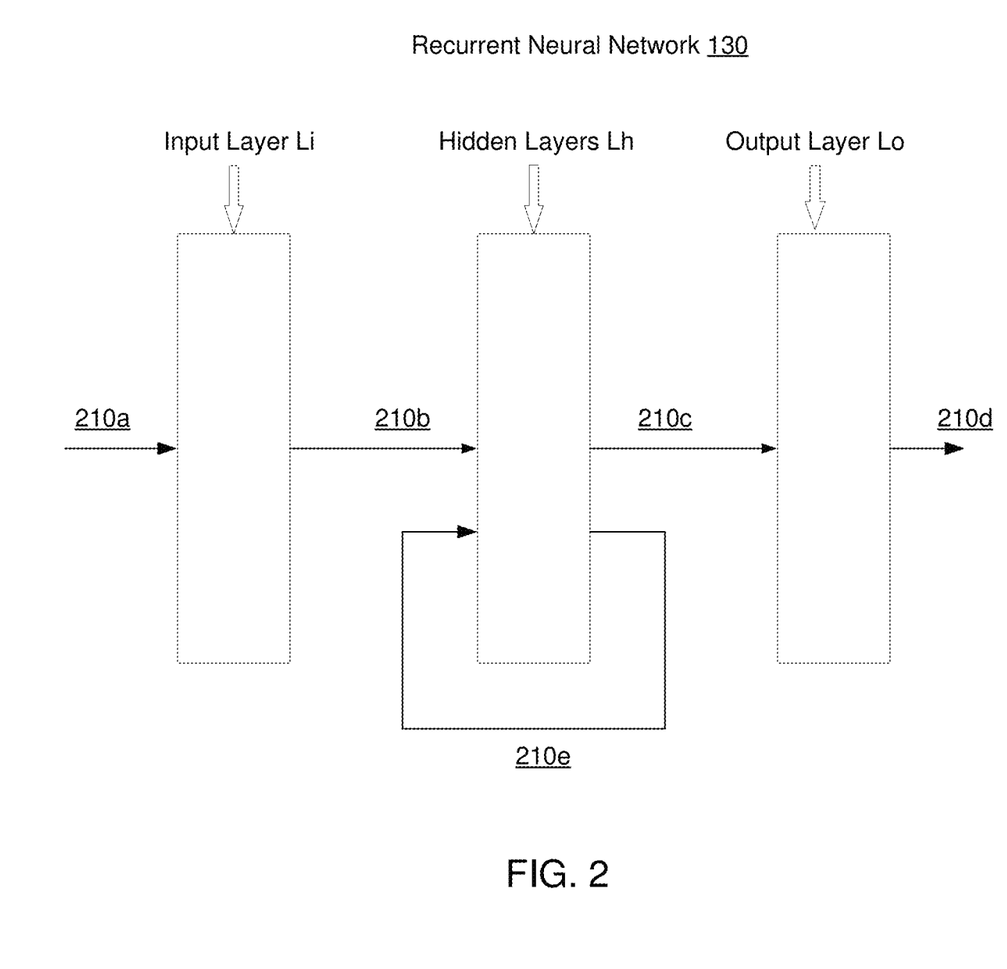
FIG. 2 is an example RNN, in accordance with an embodiment.

FIG. 2 is an example RNN, in accordance with an embodiment. The RNN 130 comprises an input layer Li, one or more hidden layers Lh, and an output layer Lo. The input layer Li receives the input via the edge 210a. The output layers Lo generates the output via one or more edges 210d. The input layer Li provides the input to the hidden layer Lh via one or more edges 210b. The hidden layer provides the input to the output layer Lo via one or more edges 210c. The edges 210e represent a feedback from an output of a layer of the RNN 130 to the input of a hidden layer. The feedback loop provides the RNN with a "memory" which captures information about what the RNN has calculated so far. This allows the RNN to process data represented as sequences of arbitrary length, for example, natural language sentences.

As described in connection with FIG. 1, the RNN architecture generator 150 represents various candidate architectures using a domain specific language (DSL). Following is a description of a DSL according to an embodiment.

Domain Specific Language for Defining RNNS

The domain specific language provides a syntax for defining RNN architectures. Accordingly, a specification using DSL sets out a search space that the RNN architecture generator 150 can traverse while searching for an RNN architecture. The syntax of the DSL is machine readable as well as human readable. The DSL allows specification of architectures for RNNs including Gated Recurrent Unit (GRU) and Long Short Term Memory (LSTM), Minimal Gate Unit (MGU), Quasi-Recurrent Neural Network (QRNN), Neural Architecture Search Cell (NASCell) and simple RNNs.

The DSL supports various operators including unary operators, binary operators, and ternary operators. Examples of unary operator are: MM operator representing a single linear layer with bias, i.e. $MM(x) := Wx+b$; Tan h operator representing the tan h function; Sigmoid operator representing the function $Sigmoid(x) = \sigma(x)$; ReLU operator representing a rectified linear unit.

Examples of binary operators include Mult operator representing element-wise multiplication, $Mult(x; y) = x \times y$; and Add operator representing element-wise addition, $Add(x; y) = x \times y$. An example of a ternary operator the Gate3 operator that performs a weighted summation between two inputs as defined by $Gate3(x,y,f) = \sigma(f) \circ x + (1-\sigma(f)) \circ y$. These operators are applied to source nodes from the set $[x_t, x_{t-1}, h_{t-1}, c_{t-1}]$, where $x_t$ and $x_{t-1}$ are the input vectors for the current and previous time step, $h_{t-1}$ is the output of the RNN for the previous timestep, and $c_{t-1}$ is optional long term memory. The Gate3 operator is used for defining some architectures, such as the GRU that re-use the output of a single Sigmoid for the purposes of gating. An example RNN architecture defined using the DSL is:

$$\tanh(\text{Add}(MM(x_t), MM(h_{t-1})))$$

The DSL may support other unary, binary, and ternary operators than those described above. For example, in some embodiments, the DSL supports additional operators including: a Div operator for determining a ratio of two values, i.e., $Div(a, b) = a/b$; a Sub operator for subtracting a first value from a second value, i.e., $Sub(a, b) = a-b$; unary operators defining trigonometric functions, for example, Sin and Cos as sine and cosine activations respectively; PosEnc representing a variable that is the result of applying positional encoding according to the current timestep; and operators representing optimizations, for example, LayerNorm operator for applying layer normalization to the input and SeLU representing the scaled exponential linear unit activation function.

An example of a DSL definition of a gated recurrent unit (GRU) illustrating how various operators are composed is as follows.

```
Gate3 (
    Tanh (
        Add (
            MM (x_t) ,
            Mult (
                MM (h_{t-1}) ,
                Sigmoid (
                    Add ( MM (h_{t-1}) , MM (x_t) )
                )
            )
        )
    ) ,
    h_{t-1},
    Sigmoid (
        Add ( MM (h_{t-1}) , MM (x_t) ),
    )
)
```

The DSL provides support for specifying architectures that use not only a hidden state $h_t$ but also an additional hidden state $c_t$ for long term memory. The value of $c_t$ is extracted from an internal node computed while producing $h_t$. The DSL supports the use of $c_t$ by numbering the nodes and then specifying which node to extract $c_t$ from (i.e. $c_t$=Node5). The node number is appended to the end of the DSL definition after a delimiter. Nodes may be numbered by following a consistent traversal of the tree representing the architecture. For example, nodes may be numbered top to bottom ($h_t$ being be largest) and left to right.

System Architecture

Figure 3:
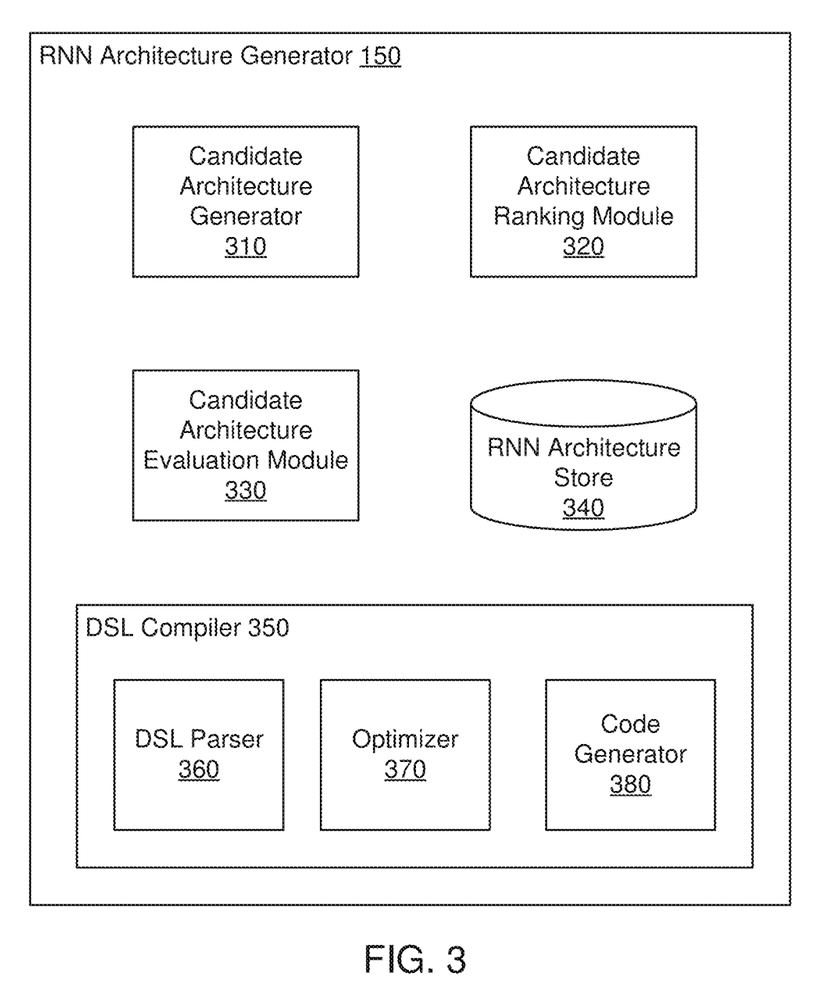
FIG. 3 is a block diagram of the system architecture of an RNN architecture generator, in accordance with an embodiment.

FIG. 3 is a block diagram of the system architecture of an RNN architecture generator, in accordance with an embodiment. The RNN architecture generator 150 includes a candidate architecture generator 310, a candidate architecture ranking module 320, a candidate architecture evaluation module 330, an RNN architecture store 340, and a DSL compiler 350. In other embodiments, the RNN architecture generator 150 may include additional, fewer, or different components for various applications. Conventional components such as network interfaces, security functions, load balancers, failover servers, management and network operations consoles, and the like are not shown so as to not obscure the details of the system architecture.

The candidate architecture generator 310 generates candidate architectures and sends them for filtering and evaluation. The candidate architecture generator 310 stores any generated RNN architectures in the RNN architecture store 340. The candidate architecture generator 310 provides candidate architectures to a candidate architecture ranking module 320 for ranking. The candidate architecture generator 310 filters candidate architectures based on the ranking. The candidate architecture evaluation module evaluates RNN architectures. Details of these modules are described herein in connection with various processes.

The DSL compiler 350 takes RNN architecture descriptions specified using the DSL and generates RNN architectures from the specification. The DSL compiler 350 comprises a DSL parser 360, an optimizer 370, and a code generator 380. Other embodiments of DSL compiler 350 may include more or fewer components.

The DSL parser 360 takes a DSL specification of an RNN architecture and parses the specification to ensure that the specification conforms to the syntax of the DSL. The DSL parser 360 builds representation (for example, data structures) that allow various software modules of the RNN architecture generator 150 to process an RNN architecture corresponding to the received DSL specification. For example, the DSL parser 360 provides the generated representation to the optimizer to perform transformations of the representation to generate more efficient architectures. The generated representation is further processed by the code generator t generate the code corresponding to the specified RNN architecture.

The optimizer 370 performs optimization to speed up execution of the RNN based on the generated code. In an embodiment, to improve the running speed of the RNN architectures, the optimizer 370 collects all matrix multiplications performed on a single source node, for example, $x_t$, $x_{t-1}$, $h_{t-1}$, or $c_{t-1}$ and batches them into a single matrix multiplication. As an example, the optimizer 370 performs this optimization to simplify the LSTM's 8 matrix multiplications, four small matrix multiplications for $x_t$ and four small matrix multiplications $h_{t-1}$, into two large matrix multiplications. This optimization results if higher efficiency of execution of the resulting RNN, for example, due to higher GPU (graphics processing unit) utilization and lower kernel launch overhead for a parallel compute platform, for example, CUDA.

The code generator 380 generates code from a DSL representation of the RNN architecture. For a given architecture definition, the code generator 380 compiles the DSL to code by traversing the tree from the source nodes towards the final node $h_t$. In an embodiment, the code generator 380 produces two sets of source code, one for initialization required by a node, such as defining a set of weights for matrix multiplication, and one for the execution of the RNN during runtime.

Processes for Generation of RNN Architectures

Various processes related to automatic generation of RNN are described herein. The steps of a process disclosed herein may be performed in an order different from that described herein and shown in the figures. Furthermore, the steps may be performed by modules different from those indicated in the description herein.

Figure 4:
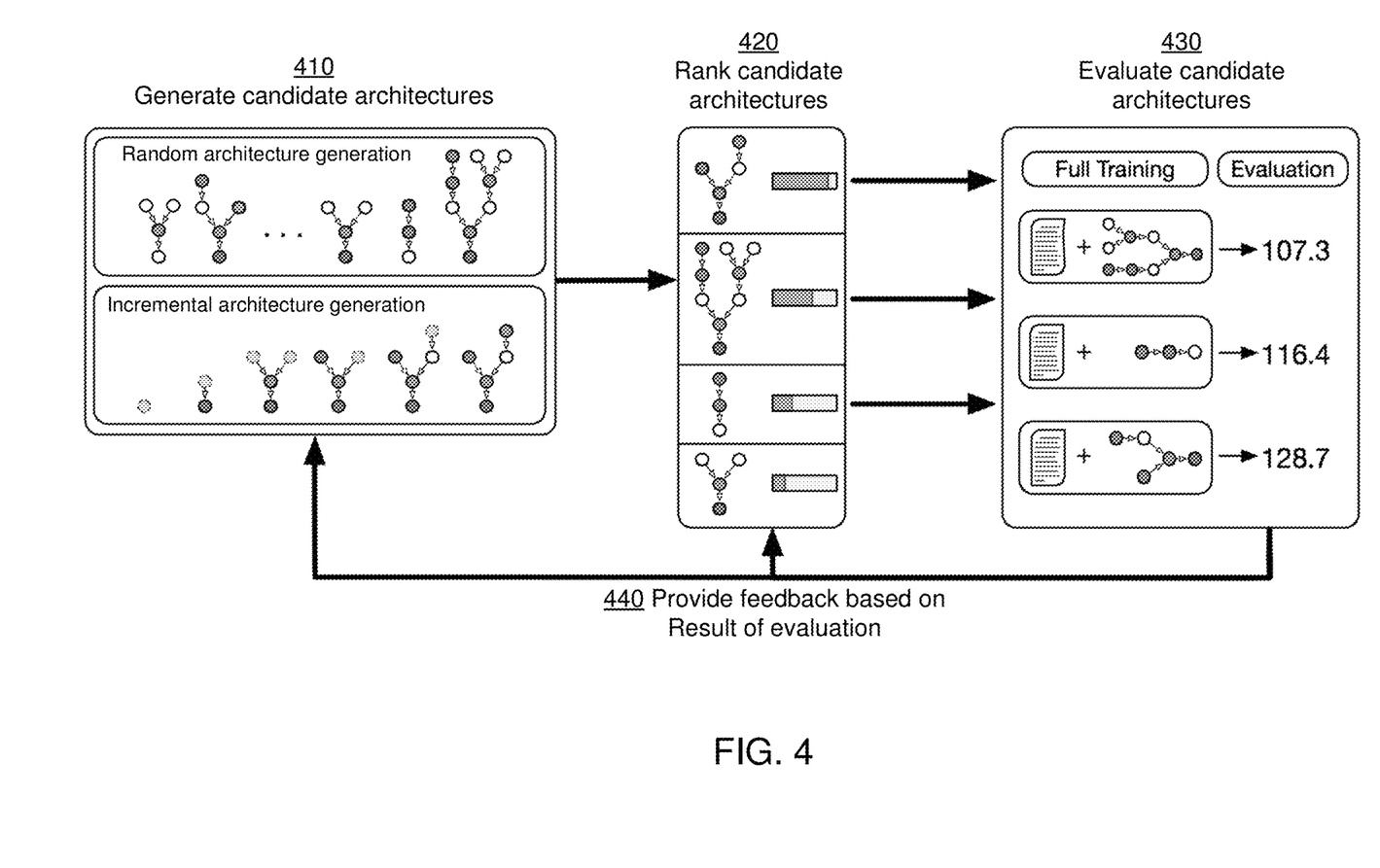
FIG. 4 shows the overall process for generation of RNN architectures, according to an embodiment.

FIG. 4 shows the overall process for generation of RNN architectures, according to an embodiment. The candidate architecture generator 310 generates 410 candidate RNN architectures represented using the DSL. In an embodiment, the candidate architecture generator 310 generates 410 candidate architectures using a random architecture generation strategy. In another embodiment, the candidate architecture generator generates 410 candidate architectures using an incremental architecture generation strategy. The incremental architecture generation strategy incrementally builds candidate RNN architectures. In an embodiment, the incremental architecture generation strategy uses an architecture generator neural network to select the next DSL operator to be added to a partial candidate RNN architecture to grow the partial candidate RNN architecture.

The candidate architecture ranking module 320 ranks 420 each candidate architecture to predict performance of the candidate architecture. In an embodiment, candidate architecture ranking module 320 determines a performance score for each input candidate architecture using an architecture ranking neural network. The candidate architecture ranking module 320 uses the performance score to filter and eliminate candidate RNN architectures that are not expected to perform well for the given task. The performance of a candidate architecture may represent an aggregate measure of accuracy of results generated by the candidate architecture. For example, the accuracy of result may represent a difference between the generated result and known result of a labelled dataset. The candidate architecture ranking module 320 may measure the performance of a candidate architecture by generating code for an RNN based on the DSL specification of the architecture and training the RNN. However, this is a slow process. Therefore, the candidate architecture ranking module 320 estimates the performance of candidate architecture by using the architecture ranking neural network.

The candidate architecture evaluation module 330 evaluates 430 the most promising candidate architectures by compiling their DSL specifications to executable code and training each model on the given task. The RNN architecture generator 150 forms training data set comprising architecture-performance pairs based on the result of the training and evaluation. The RNN architecture generator 150 uses the training data set to train the architecture ranking neural network used by the candidate architecture ranking module 320. The training data set can also be used to train the architecture generator neural network further described herein.

RNN Architecture Generation

Figure 5:
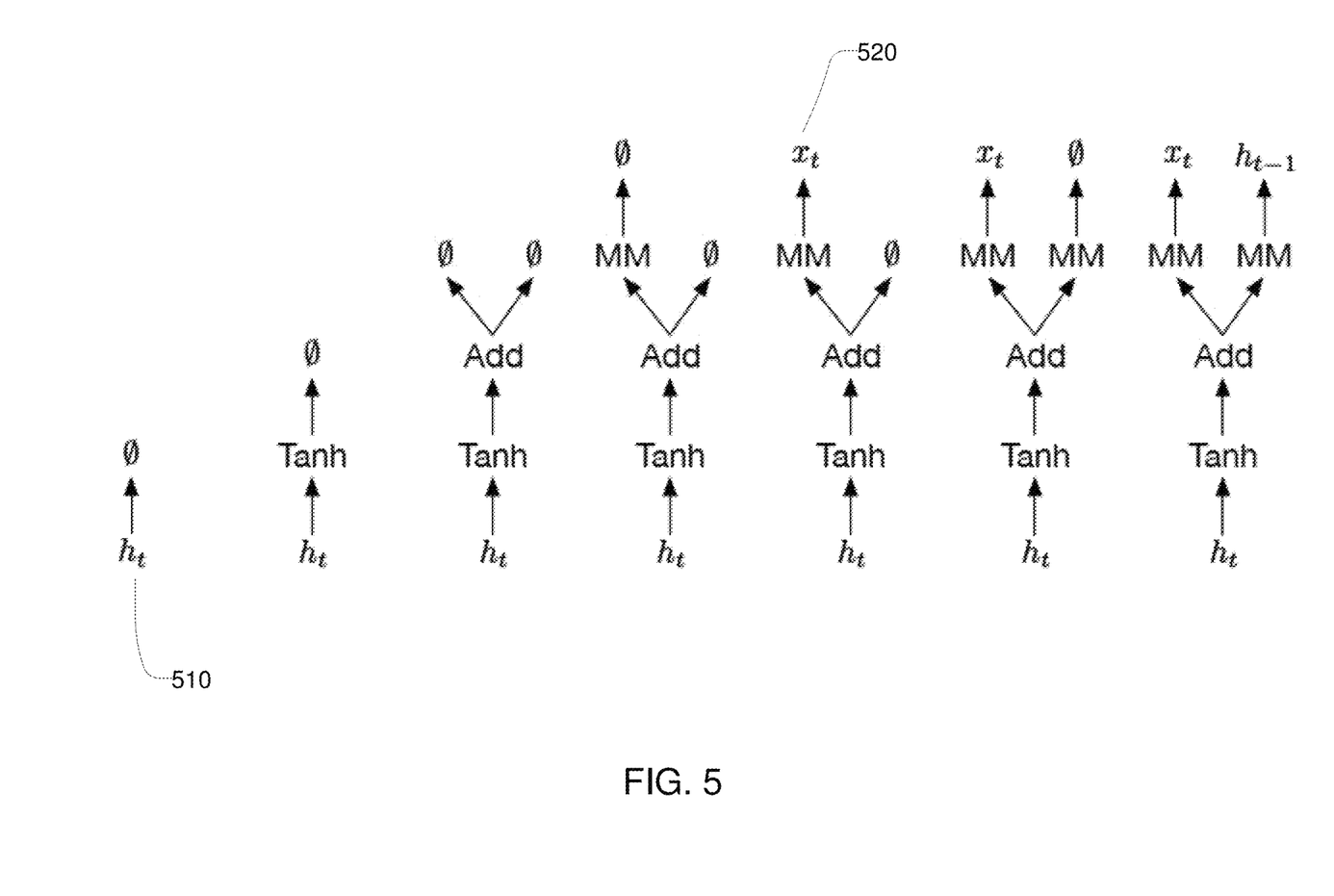
FIG. 5 shows examples illustrating the process for generation of candidate RNN architectures, according to an embodiment.

FIG. 5 shows examples illustrating the process for generation of candidate RNN architectures, according to an embodiment. The candidate architecture generator 310 grows the architectures beginning at the output $h_t$. The candidate architecture generator 310 uses an empty node ø as a placeholder node for an operator node or a source node to be filled in. A source node corresponds to an input value, for example, $x_t$.

The candidate architecture generator 310 selects operators beginning from the output node $h_t$, and adds them to the tree representing the computation of an RNN. The candidate architecture generator 310 initializes a partial candidate architecture 510 comprising an output node $h_t$ pointing at an empty node ø. If the candidate architecture generator 310 determines that an operator has one or more children to be filled, the candidate architecture generator 310 fills the children in order from left to right.

The candidate architecture generator 310 builds candidate architectures represented using the DSL, incrementally a node at a time starting from the output $h_t$. In one embodiment, the candidate architecture generator 310 randomly selects the next node from the set of operators for adding to a tree representing a partially constructed candidate RNN architecture. In another embodiment, the candidate architecture generator 310 uses reinforcement learning to select the next node for adding to a tree representing a partially constructed candidate RNN architecture. Use of reinforcement learning allows the candidate architecture generator 310 to focus on promising directions in the space of possible RNN architectures.

In an embodiment, the candidate architecture generator 310 performs intelligent selection of the next node 520 to add to a partial RNN architecture using two components: a tree encoder that represents the current state of the partial RNN architecture and a machine learning based model which is configured to receive as input a representation of the current partial RNN architecture and predicts the next node for adding to the partial RNN architecture. In an embodiment, the tree encoder is an LSTM (long short term memory) neural network applied recursively to a node token and all its children.

In an embodiment, the machine learning based model used to predict the next node to be added to a partial RNN architecture is a neural network, referred to herein as an architecture generator neural network. In an embodiment, the architecture generator neural network is an RNN. The architecture generator neural network generates scores for each operator that can be added as a node to the partial RNN architecture. The candidate architecture generator 310 selects an operator for adding as a node to the partial RNN architecture based on the generated score values.

Figure 6:
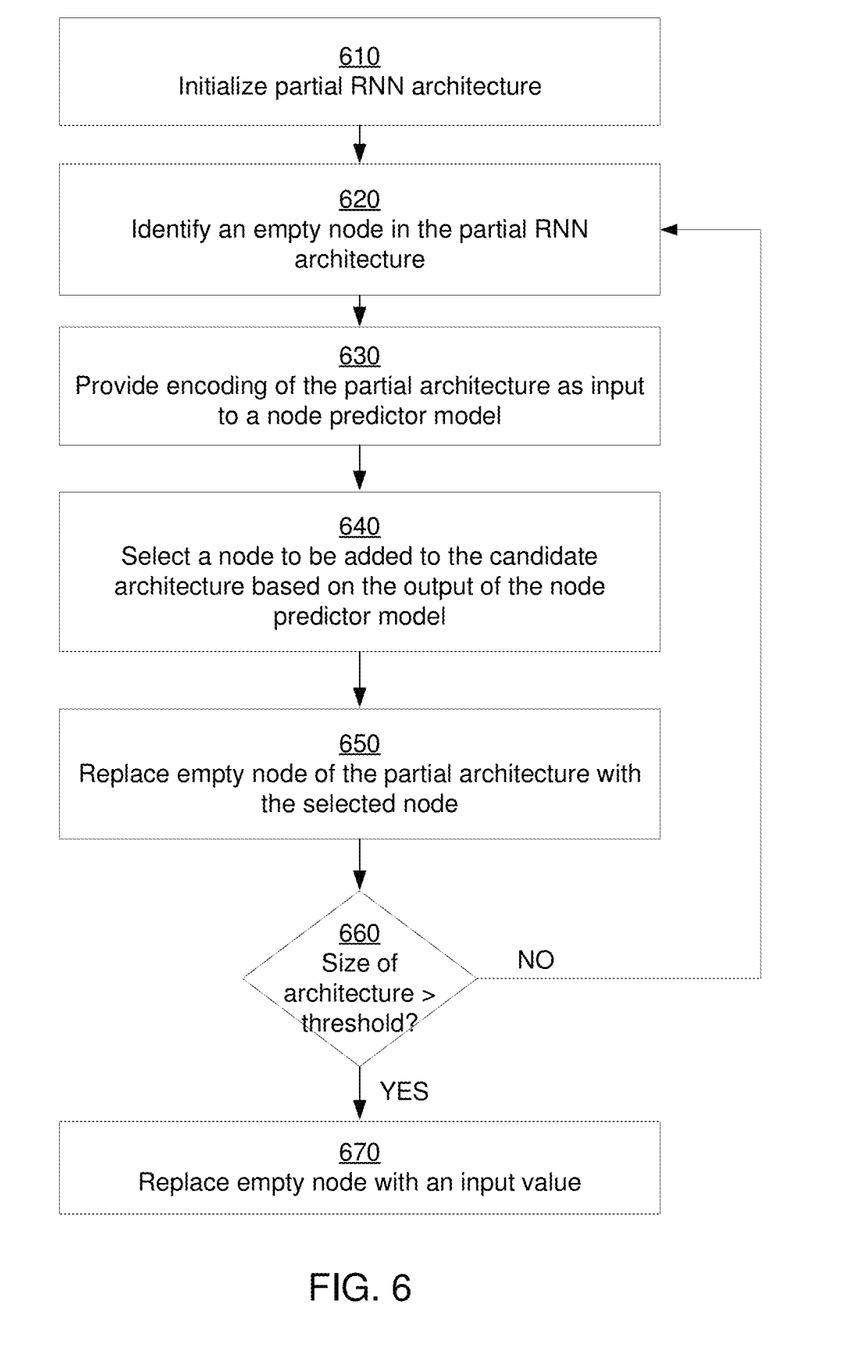
FIG. 6 shows a flowchart illustrating the process of generation of a candidate RNN architecture, according to an embodiment.

FIG. 6 shows a flowchart illustrating the process of generation of a candidate RNN architecture, according to an embodiment. The candidate architecture generator 310 initializes 610 a partial RNN architecture. The candidate architecture generator 310 identifies 620 an empty node ø in the partial RNN architecture. The candidate architecture generator 310 provides 630 an encoding of the partial RNN architecture as an input to the architecture generator neural network. The architecture generator neural network outputs scores corresponding to nodes that can be added to the partial RNN architecture in place of the empty node ø. The candidate architecture generator 310 selects 640 a node for adding to the partial RNN architecture based on the generated scores. The candidate architecture generator 310 replaces 650 the empty node of the partial architecture with the selected node. If the candidate architecture generator 310 replaces 650 the empty node of the partial architecture with an operator node, the operator node may point at one or more empty nodes ø. For example, a unary node points at one empty node ø, representing the single input, a binary node points at two empty nodes ø, representing each input, and so on.

The candidate architecture generator 310 checks 660 if the size of the partial RNN architecture is greater than a threshold value. The candidate architecture generator 310 may determine the size of a partial RNN architecture as the height (or depth) of the tree representing the partial RNN architecture, i.e., the maximum distance from the output node $h_t$ and the nodes of the tree representing the partial RNN architecture. Alternatively, the candidate architecture generator 310 may determine the size of a partial RNN architecture as the total number of nodes in the tree representing the partial RNN architecture. The threshold value may be a configurable value that may be decided by an expert or based on evaluation of performances of RNNs previously generated by the candidate architecture generator 310.

Accordingly, the candidate architecture generator 310 forces the next child added to the tree while growing the tree to be one of the source nodes if the candidate architecture generator 310 determines that adding further non-source nodes would cause the tree to exceed the maximum height. Accordingly, if the candidate architecture generator 310 determines that the size of the partial RNN architecture is less than (or equal to) the threshold value, the candidate architecture generator 310 repeats the steps 620, 630, 640, 650, and 660 to add other operators to the partial RNN architecture. If the candidate architecture generator 310 determines that the size of the partial RNN architecture is greater than the threshold value, the candidate architecture generator 310 replaces the empty value ø with a source node, for example, $x_t$. Once all empty nodes ø of a partial RNN architecture are replaced with either an operator node or a source node, the partial RNN architecture becomes an RNN architecture. The candidate architecture generator 310 may provide the generated RNN architecture to the candidate architecture ranking module 320 for ranking or to the candidate architecture evaluation module 330 for evaluation.

In an embodiment, the process illustrated in FIG. 6 uses a target token to identify 620 the empty node to be processed next. A partial RNN architecture may contain two or more empty nodes, for example, $h_t$=Gate3(ø, ø, σ(ø)). Accordingly, the candidate architecture generator 310 introduces a target token, T, which identifies the next node to be introduced. For example, the candidate architecture generator 310 may use a representation $h_t$=Gate3(T, ø, σ(ø)), to indicate to the tree encoder that the first argument represents the node to be filled next.

In an embodiment, the candidate architecture generator 310 orders the candidate architectures to prevent multiple representations for equivalent architectures. The DSL allows flexibility in representing RNN architecture thereby allowing multiple DSL specifications that result in the same RNN architecture. For example, commutative operators (i.e. Add (a, b)=Add(b, a)), can have two DSL representations of the same operator, depending on the order in which the inputs are specified. The candidate architecture generator 310 defines a canonical ordering of an architecture by sorting the arguments of any commutative node. For example, each argument is represented as an alphanumeric value and the arguments are stored alphabetically or numerically as necessary. The sorted arguments have a single representation, independent of the number of arguments. The candidate architecture generator 310 uses a DSL representation of an RNN architecture that uses a sorted list of the arguments of each commutative operator. If the candidate architecture generator 310 determines that an operator is order sensitive, for example, Sub and Div operators, the candidate architecture generator 310 does not perform reordering of the arguments of the operators.

Candidate RNN Architecture Ranking

The candidate architecture evaluation module 330 may be used to evaluate candidate RNN architectures. However, the candidate architecture evaluation module 330 evaluates the candidate RNN architectures by training RNNs generated from the candidate RNN architecture specification. This can be a slow and inefficient process. Embodiments of the candidate architecture ranking module 320 predict a performance of a candidate RNN architecture using a machine learning based model.

Figure 7:
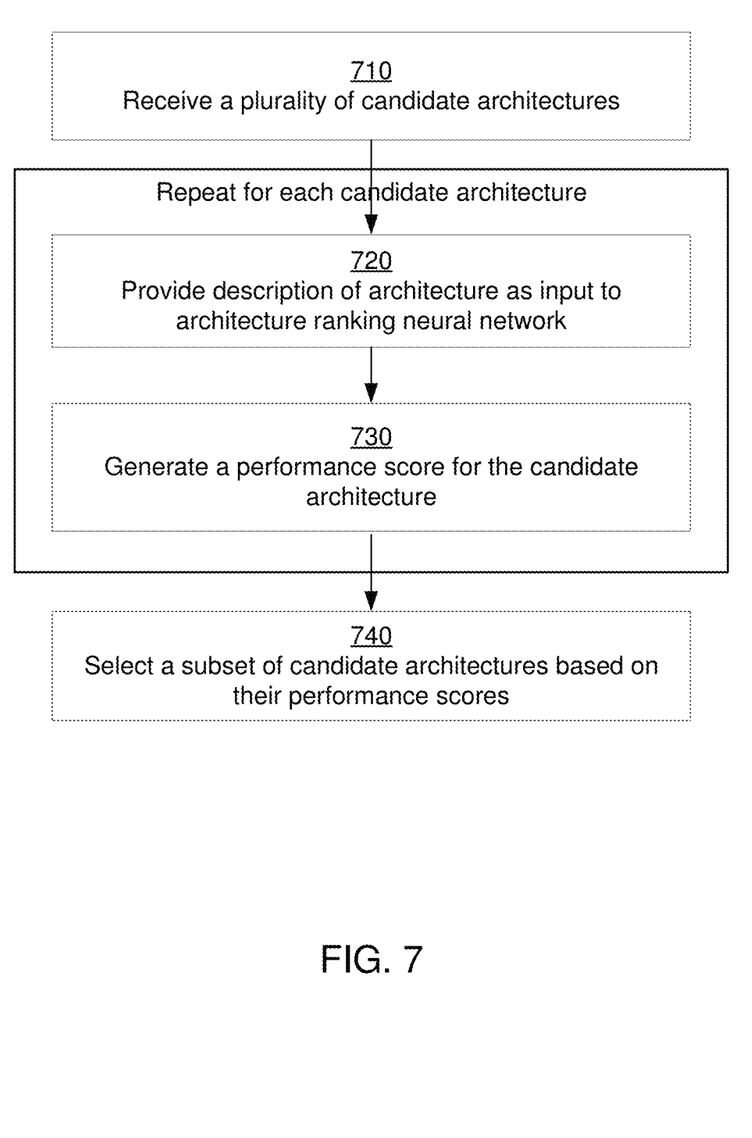
FIG. 7 shows a flowchart illustrating the process of ranking of candidate RNN architectures, according to an embodiment.

FIG. 7 shows the process for ranking of candidate RNN architectures, according to an embodiment. The candidate architecture ranking module 320 receives a plurality of candidate RNN architectures generated by the candidate architecture generator 310. The candidate architecture ranking module 320 estimates the performance of each of the plurality of candidate architectures. The performance of a candidate architecture indicates the ability of the candidate architecture to perform a given task, for example, machine translation. A candidate RNN architecture with high performance score performs the given task with high accuracy. Accordingly, the results obtained from an RNN generated from the candidate RNN architecture with high performance score have a high likelihood of matching known results, for example, for a labelled dataset.

The candidate architecture ranking module 320 provides 720 an encoding of the candidate RNN architecture, for example, the DSL specification of the candidate RNN architecture as input to an architecture ranking neural network. The architecture ranking neural network generates a performance score for the candidate RNN architecture. The performance score indicates the performance of the candidate RNN architecture. The candidate architecture ranking module 320 selects 740 a subset of the plurality of candidate RNN architectures based on their performance scores.

According to an embodiment, the candidate architecture ranking module 320 trains an architecture ranking neural network to predict performance of a given RNN architecture. The candidate architecture ranking module 320 trains the architecture ranking neural network using training data set comprising RNN architectures that were previously evaluated by the candidate architecture evaluation module 330 and their known performance scores. The training dataset may also comprise RNN architectures provided by experts along with their performance scores estimated by experts. In an embodiment, the architecture ranking neural network is an RNN. The architecture ranking neural network represents the sources nodes ($x_t$, $x_{t-1}$, $h_{t-1}$, and $c_{t-1}$) by a learned vector representation and represents operators by learned functions. In an embodiment, the architecture ranking neural network represents operator nodes using tree-structured long short-term memory networks.

In an embodiment, the candidate architecture ranking module 320 unrolls a candidate RNN architecture for a single time-step, replacing $h_{t-1}$, and $c_{t-1}$ with their relevant graph and subgraph. This allow the representation of $h_{t-1}$ to identify the source nodes and operators used to produce $h_{t-1}$. Unrolling is improve the representation of $h_{t-1}$, it is allows an accurate representation of $c_{t-1}$.

Candidate RNN Architecture Evaluation

Figure 8:
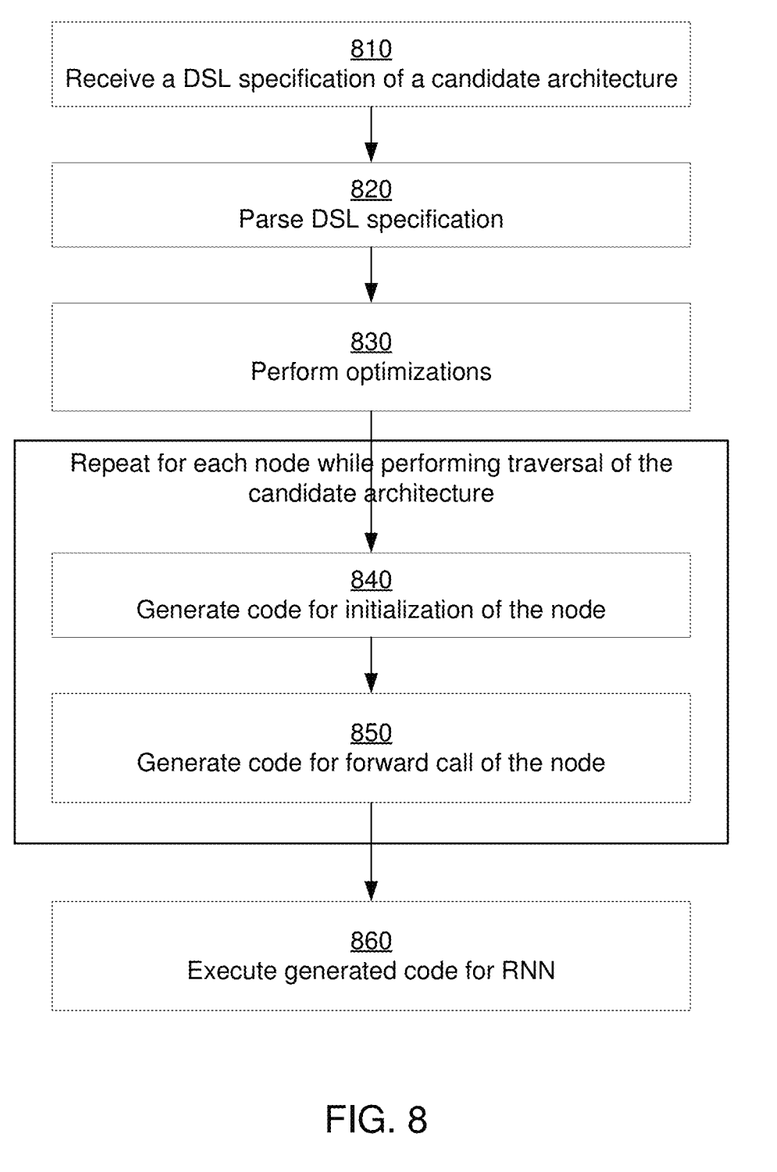
FIG. 8 shows a flowchart illustrating the process for code generation from a DSL specification of an RNN architecture, according to an embodiment.

The evaluation of a candidate RNN architecture is performed by generating code representing the RNN architecture. FIG. 8 shows the process for code generation from a DSL specification of an RNN architecture, according to an embodiment. The process may also be used for generating an RNN based on a candidate RNN architecture that is finally selected for use in applications. The DSL compiler receives 810 a DSL specification of a candidate architecture.

The DSL parser 360 parses the DSL specification to generate a representation of the candidate RNN architecture comprising data structures that provide efficient access to all the information describing the candidate RNN architecture. The optimizer 370 may perform some optimizations to improve the performance of the candidate RNN architectures. The optimizations may be performed by transforming the representation of the candidate RNN architecture into other equivalent representations of the candidate RNN architecture that provide the same results but are more efficient.

The code generator 380 performs a traversal of the candidate architecture and repeats following code generation steps for each node. The code generator 380 generates 840 code for initialization of the node. The code generator 380 further generates 850 code for a forward call of the node. The candidate architecture evaluation module 330 or an application executes 860 the generated code for the RNN.

Candidate RNNs generated by embodiments disclosed herein generate architectures that do not follow human intuition, yet perform well for given tasks. Embodiments disclosed can be used for tasks such as language modeling (LM) and machine translation (MT) but are not limited to these tasks.

Computer Architecture

Figure 9:
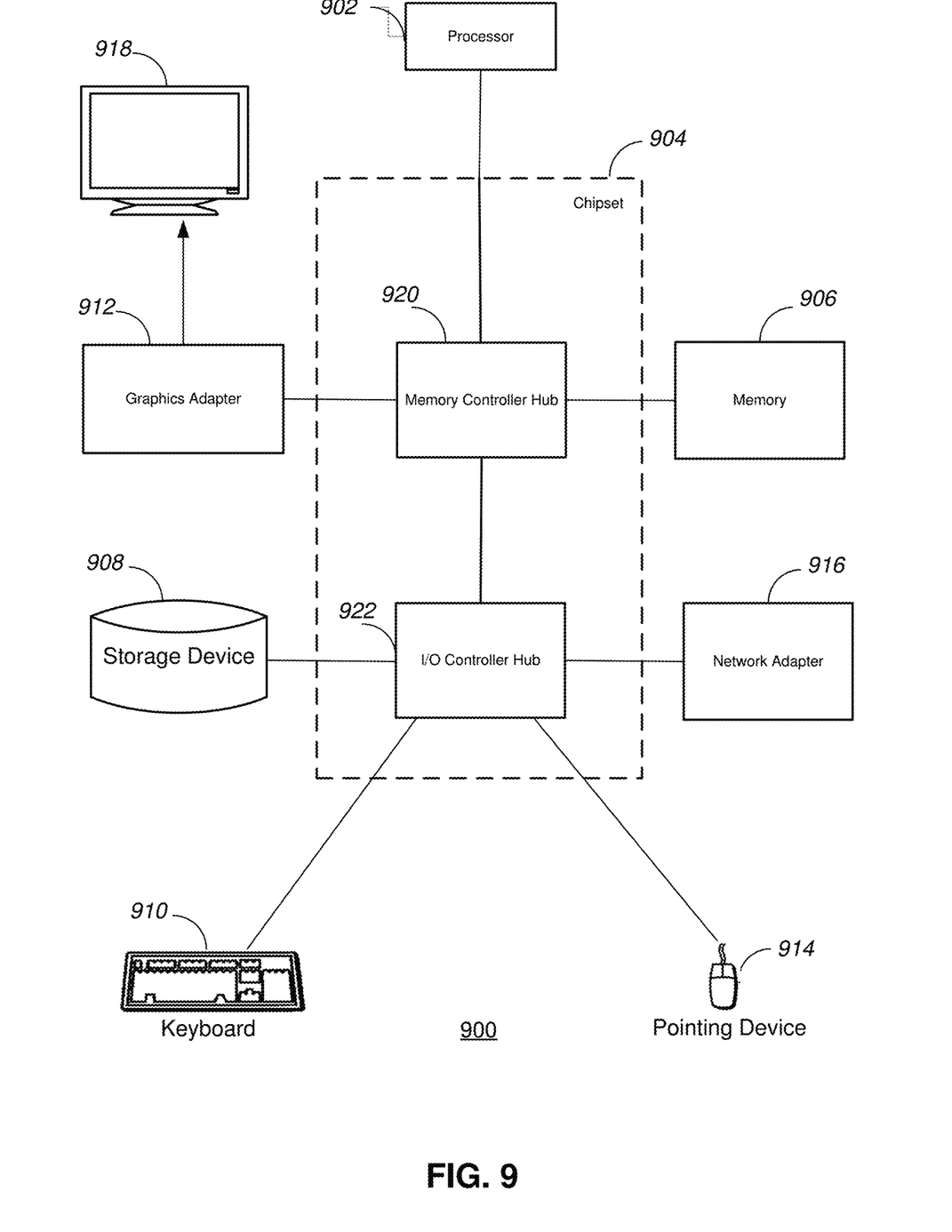
FIG. 9 is a high-level block diagram illustrating an example computer for implementing the client device and/or the system of FIG. 1.

FIG. 9 is a high-level block diagram illustrating an example computer for implementing the client device and/or the computing system of FIG. 1. The computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, an input device 914, and network adapter 916 are coupled to the I/O controller hub 922. Other embodiments of the computer 900 have different architectures.

The storage device 908 is a non-transitory computer-readable storage medium such as a hard drive, compact disk read-only memory (CD-ROM), DVD, or a solid-state memory device. The memory 906 holds instructions and data used by the processor 902. The input interface 914 is a touch-screen interface, a mouse, track ball, or other type of pointing device, a keyboard 910, or some combination thereof, and is used to input data into the computer 900. In some embodiments, the computer 900 may be configured to receive input (e.g., commands) from the input interface 914 via gestures from the user. The graphics adapter 912 displays images and other information on the display 918. The network adapter 916 couples the computer 900 to one or more computer networks.

The computer 900 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 908, loaded into the memory 906, and executed by the processor 902.

The types of computers 900 used by the entities of FIG. 1 can vary depending upon the embodiment and the processing power required by the entity. The computers 900 can lack some of the components described above, such as graphics adapters 912, and displays 918. For example, the system 140 can be formed of multiple blade servers communicating through a network such as in a server farm.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating a candidate recurrent neural network (RNN) architecture having a representation of a domain specific language (DSL), wherein the representation of the candidate RNN architecture comprises one or more operators of the DSL, the generating of the candidate RNN architecture comprising:
   starting from a hidden state node of a current time step of the candidate RNN architecture to a hidden state node of a previous time step of the candidate RNN architecture, adding an empty node to the hidden state node of the current time step as a placeholder node;
   initializing a partial RNN architecture including the hidden state node of the current time step and the empty node;
   replacing, by an architecture generator neural network, the placeholder node with an operator node corresponding to one of the one or more operators of the DSL;
   adding another empty node to the operator node as another placeholder; and
   ranking the candidate RNN architecture, the ranking comprising:
   providing an encoding of the candidate RNN architecture as input to an architecture ranking neural network configured to determine a score for the candidate RNN architecture, the score representing a performance of the candidate RNN architecture for a particular type of task, the performance representing an aggregate measure of an accuracy of the candidate RNN architecture, and wherein the architecture ranking neural network is trained based on a training data set including previous RNN architectures and known performance scores for the previous RNN architectures, and
   executing the architecture ranking neural network to generate the score of the candidate RNN architecture;
   comparing the score of the candidate RNN architecture with a score of another candidate RNN architecture;
   selecting one of the candidate RNN architecture and the other candidate RNN architecture based on respective scores; and
   compiling the selected candidate RNN architecture to generate a target RNN.

2. The method of claim 1, wherein the architecture generator neural network is trained using a training dataset comprising tuples, each tuple comprising a sample partial RNN architecture and a score value associated with a candidate node for adding to the sample partial RNN architecture.

3. The method of claim 1, wherein the compiling of the selected candidate RNN architecture to generate the target RNN, comprising:
   generating code for initializing nodes of the target RNN; and
   generating code representing a forward call corresponding to the node.

4. The method of claim 1, wherein the architecture ranking neural network is a recurrent neural network.

5. The method of claim 1, wherein the architecture ranking neural network is trained using a training dataset comprising tuples, each tuple comprising a sample RNN architecture and a score value indicating a performance of the sample RNN architecture.

6. The method of claim 1, wherein the DSL comprises one or more unary operators, wherein a unary operator represents an activation function comprising one of a linear operator specifying a weight and a bias value, a sigmoid operator, a tanh operator, or a ReLU operator representing a rectified linear unit.

7. The method of claim 1, wherein the DSL comprises one or more binary operators, wherein a binary operator comprises one of an addition operator, a multiplication operator, a subtraction operator, or a division operator.

8. The method of claim 1, wherein the DSL comprises one or more tertiary operators, wherein a tertiary operator represents a gate3 operator performing a weighted summation based on two inputs, wherein the weight is represented by a third input.

9. A non-transitory computer readable storage medium storing instructions that when executed by a computer processor cause the computer processor to perform steps comprising:
- generating a candidate recurrent neural network (RNN) architecture having a representation of a domain specific language (DSL), wherein the representation of the candidate RNN architecture comprises one or more operators of the DSL, the generating of the candidate RNN architecture comprising:
  - starting from a hidden state node of a current time step of the candidate RNN architecture to a hidden state node of a previous time step of the candidate RNN architecture, adding an empty node to the hidden state node of the current time step as a placeholder node;
  - initializing a partial RNN architecture including the hidden state node of the current time step and the empty node;
  - replacing, by an architecture generator neural network, the placeholder node with an operator node corresponding to one of the one or more operators of the DSL;
  - adding another empty node to the operator node as another placeholder; and
  - ranking the candidate RNN architecture, the ranking comprising:
  - providing an encoding of the candidate RNN architecture as input to an architecture ranking neural network configured to determine a score for the candidate RNN architecture, the score representing a performance of the candidate RNN architecture for a particular type of task, the performance representing an aggregate measure of an accuracy of the candidate RNN architecture, and wherein the architecture ranking neural network is trained based on a training data set including previous RNN architectures and known performance scores for the previous RNN architectures, and
  - executing the architecture ranking neural network to generate the score of the candidate RNN architecture;
  - comparing the score of the candidate RNN architecture with a score of another candidate RNN architecture;
  - selecting one of the candidate RNN architecture and the other candidate RNN architecture based on respective scores; and
  - compiling the selected candidate RNN architecture to generate a target RNN.

10. The non-transitory computer readable storage medium of claim 9, wherein the architecture generator neural network is trained using a training dataset comprising tuples, each tuple comprising a sample partial RNN architecture and a score value associated with a candidate node for adding to the sample partial RNN architecture.

11. The non-transitory computer readable storage medium of claim 9, further comprising instructions for compiling the candidate architecture to generate the target RNN by performing steps comprising:
- generating code for initializing nodes of the target RNN; and
- generating code representing a forward call corresponding to the node.

12. The non-transitory computer readable storage medium of claim 9, wherein the architecture ranking neural network is a recurrent neural network.

13. The non-transitory computer readable storage medium of claim 9, wherein the architecture ranking neural network is trained using a training dataset comprising tuples, each tuple comprising a sample RNN architecture and a score value indicating a performance of the sample RNN architecture.

14. A computer system comprising:
- one or more computer processors; and
- a non-transitory computer readable storage medium comprising computer executable code that when executed by the one or more processors causes the one or more processors to perform operations comprising:
  - generating a candidate recurrent neural network (RNN) architecture having a representation of a domain specific language (DSL), wherein the representation of the candidate RNN architecture comprises one or more operators of the DSL, the generating of the candidate RNN architecture comprising:
    - starting from a hidden state node of a current time step of the candidate RNN architecture to a hidden state node of a previous time step of the candidate RNN architecture, adding an empty node to the hidden state node of the current time step as a placeholder node;
    - initializing a partial RNN architecture including the hidden state node of the current time step and the empty node;
    - replacing, by an architecture generator neural network, the placeholder node with an operator node corresponding to one of the one or more operators of the DSL;
    - adding another empty node to the operator node as another placeholder; and
    - ranking the candidate RNN architecture, the ranking comprising:
    - providing an encoding of the candidate RNN architecture as input to an architecture ranking neural network configured to determine a score for the candidate RNN architecture, the score representing a performance of the candidate RNN architecture for a particular type of task, the performance representing an aggregate measure of an accuracy of the candidate RNN architecture, and wherein the architecture ranking neural network is trained based on a training data set including previous RNN architectures and known performance scores for the previous RNN architectures, and
    - executing the architecture ranking neural network to generate the score of the candidate RNN architecture;
    - comparing the score of the candidate RNN architecture with a score of another candidate RNN architecture;
    - selecting one of the candidate RNN architecture and the other candidate RNN architecture based on respective scores; and
    - compiling the selected candidate RNN architecture to generate a target RNN.

15. The method of claim 1, wherein the encoding of the candidate RNN architecture is represented using the DSL in a DSL specification, and wherein providing the encoding of the candidate RNN architecture as input to the architecture ranking neural network comprises providing the DSL specification of the candidate RNN architecture as input to the architecture ranking neural network.

16. The non-transitory computer readable storage medium of claim 9, wherein the encoding of the candidate RNN architecture is represented using the DSL in a DSL specification, and wherein providing the encoding of the candidate RNN architecture as input to the architecture ranking neural network comprises providing the DSL specification of the candidate RNN architecture as input to the architecture ranking neural network.

17. The system of claim 14, wherein the encoding of the candidate RNN architecture is represented using the DSL in a DSL specification, and wherein providing the encoding of the candidate RNN architecture as input to the architecture ranking neural network comprises providing the DSL specification of the candidate RNN architecture as input to the architecture ranking neural network.

18. The method of claim 1, wherein the architecture ranking neural network is configured to determine the score by applying trained parameters of the architecture ranking neural network trained based on the training data set to the encoding of the candidate RNN architecture.

19. The non-transitory computer readable storage medium of claim 9, wherein the architecture ranking neural network is configured to determine the score by applying trained parameters of the architecture ranking neural network trained based on the training data set to the encoding of the candidate RNN architecture.

20. The computer system of claim 14, wherein the architecture ranking neural network is configured to determine the score by applying trained parameters of the architecture ranking neural network trained based on the training data set to the encoding of the candidate RNN architecture.

21. The method of claim 1, further comprising using reinforcement learning to select the empty node or the other empty node.

22. The method of claim 1, further comprising using:
 a tree encoder to represent a current state of the partial RNN architecture; and
 a machine based learning model to receive representation of the current state of the partial RNN architecture as input and predicts the empty node or the other empty node.

23. The method of claim 22, wherein the tree encoder includes a long short term memory (LSTM) neural network.

24. The method of claim 22, further comprising determining a depth of the partial RNN architecture, the depth being a maximum distance from the hidden state point at the time step and the other placeholder.

25. The method of claim 24, further comprising, in response to the depth being greater than a threshold value, replacing the other placeholder with an input vector for the current time step.

26. The method of claim 24, further comprising: in response to the depth being less than or equal to a threshold value, replacing, by the architecture generator neural network, the other placeholder with another operator node corresponding to one of the one or more operators of the DSL.

* * * * *